No. 735,482. PATENTED AUG. 4, 1903.
G. A. ENSIGN.
SPOOL CUTTING LATHE.
APPLICATION FILED OCT. 18, 1902.
NO MODEL.
5 SHEETS—SHEET 1.

WITNESSES:
Edward Thorpe

INVENTOR
George A. Ensign
BY
ATTORNEYS.

No. 735,482. PATENTED AUG. 4, 1903.
G. A. ENSIGN.
SPOOL CUTTING LATHE.
APPLICATION FILED OCT. 18, 1902.
NO MODEL. 5 SHEETS—SHEET 3.

WITNESSES:
Edward Thorpe
Rev. G. Hoster

INVENTOR
George A. Ensign
BY
ATTORNEYS.

No. 735,482. PATENTED AUG. 4, 1903.
G. A. ENSIGN.
SPOOL CUTTING LATHE.
APPLICATION FILED OCT. 18, 1902.
NO MODEL. 5 SHEETS—SHEET 4.

WITNESSES:
Edward Thorpe.
Geo. G. Hoskins

INVENTOR
George A. Ensign
BY
ATTORNEYS.

No. 735,482. PATENTED AUG. 4, 1903.
G. A. ENSIGN.
SPOOL CUTTING LATHE.
APPLICATION FILED OCT. 18, 1902.
NO MODEL. 5 SHEETS—SHEET 5.
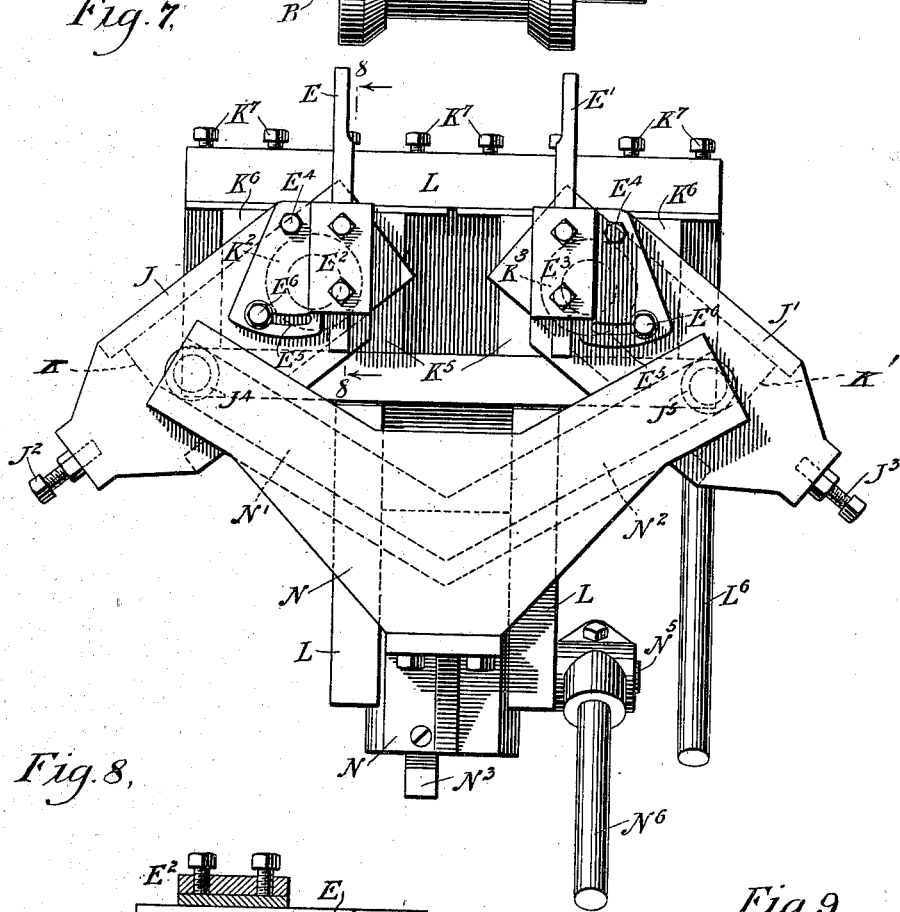
WITNESSES: Edward Thorpe
INVENTOR
George A. Ensign
BY
ATTORNEYS.

No. 735,482. Patented August 4, 1903.

UNITED STATES PATENT OFFICE.

GEORGE A. ENSIGN, OF DEFIANCE, OHIO, ASSIGNOR TO DEFIANCE MACHINE WORKS, OF DEFIANCE, OHIO.

SPOOL-CUTTING LATHE.

SPECIFICATION forming part of Letters Patent No. 735,482, dated August 4, 1903.

Application filed October 18, 1902. Serial No. 127,784. (No model.)

*To all whom it may concern:*

Be it known that I, GEORGE A. ENSIGN, a citizen of the United States, and a resident of Defiance, in the county of Defiance and State of Ohio, have invented a new and Improved Spool-Cutting Lathe, of which the following is a full, clear, and exact description.

The invention relates to woodworking machinery; and its object is to provide a new and improved spool-cutting lathe more especially designed to finish roughened-out spools in a very simple manner, rendering the spools uniform in shape and finish and allowing the finishing of spools of different shapes and sizes.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1:
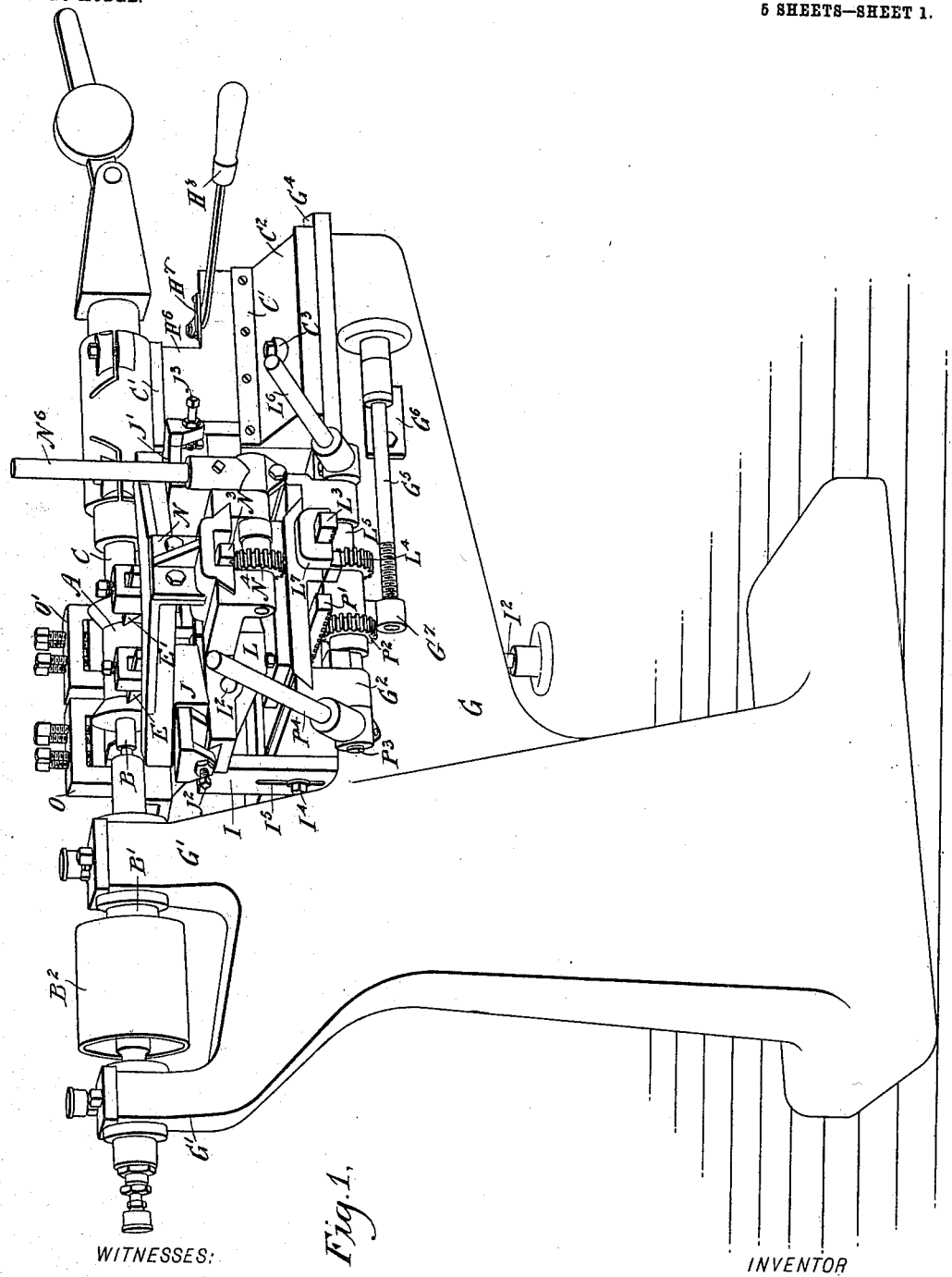
Figure 2:
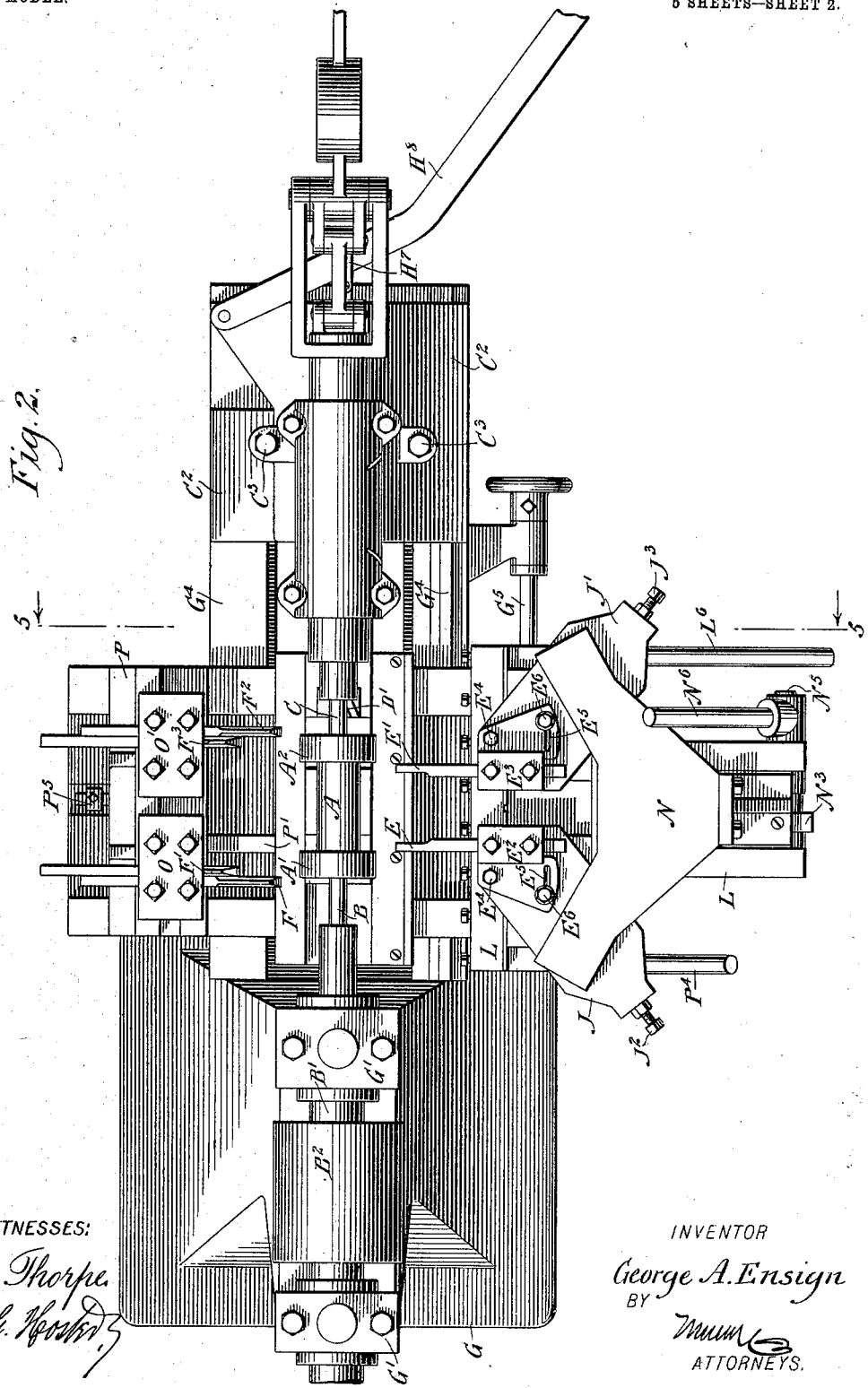
Figure 3:
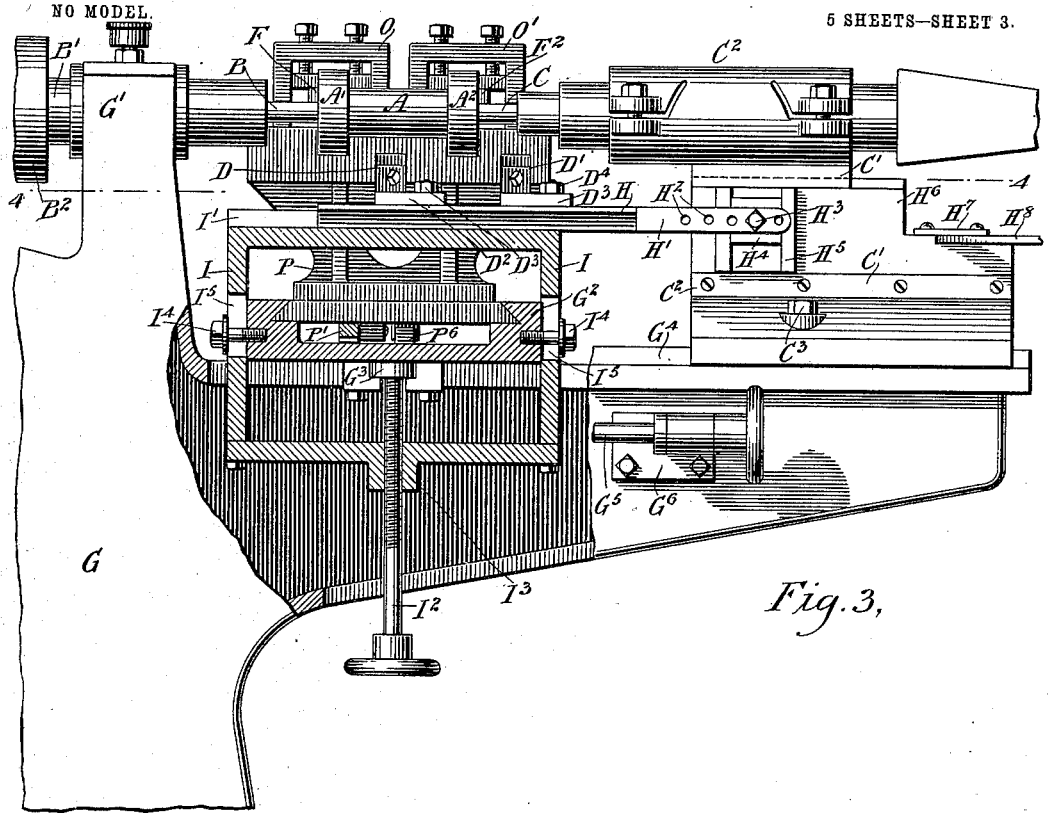
Figure 4:
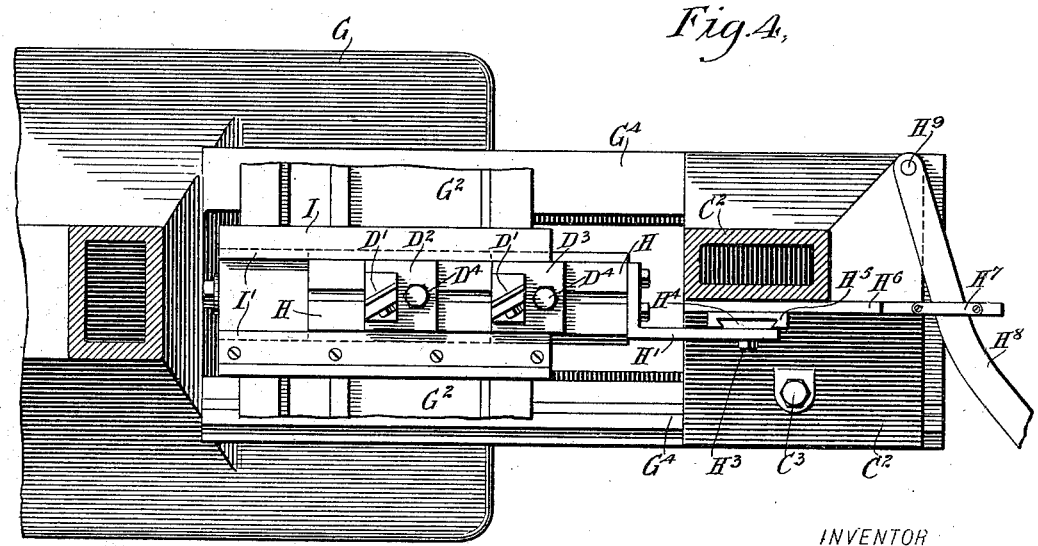
Figure 5:
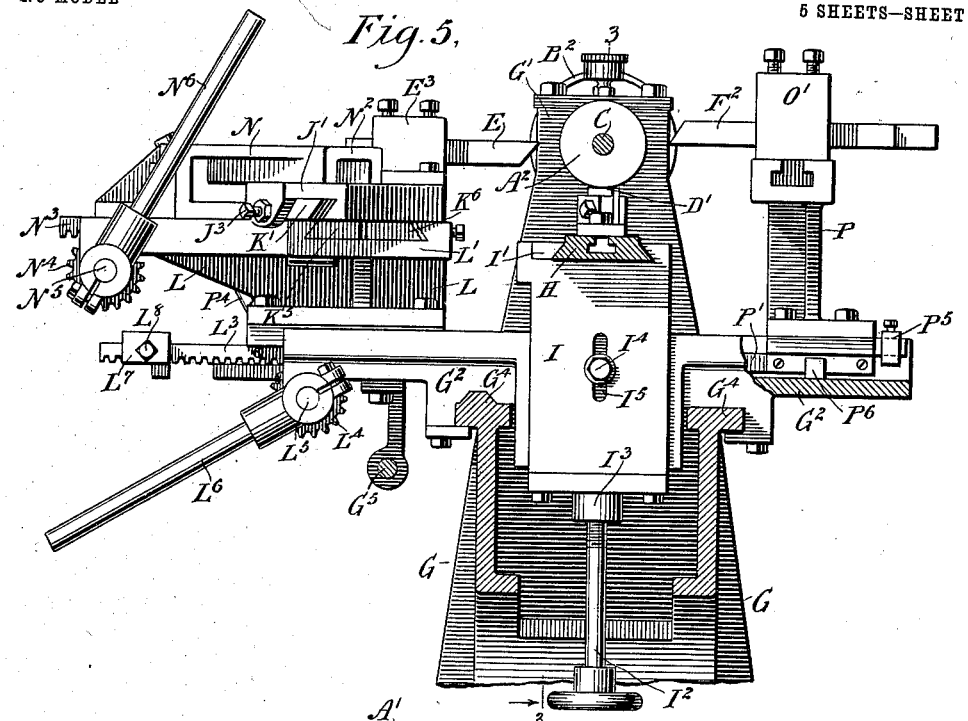
Figure 6:
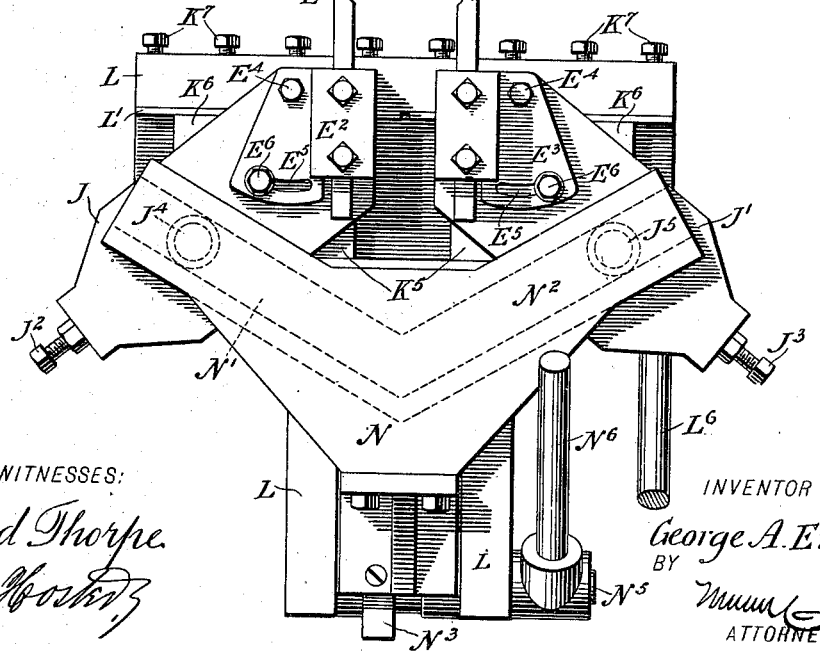

Figure 1 is a perspective view of the improvement. Fig. 2 is a plan view of the same. Fig. 3 is a longitudinal sectional elevation of the same on the line 3 3 of Fig. 5. Fig. 4 is a sectional plan view of the same on the line 4 4 of Fig. 3. Fig. 5 is a cross-section of the same on the line 5 5 of Fig. 2. Fig. 6 is an enlarged plan view of the mechanism for finishing the inner beveled faces of the spool-flanges. Fig. 7 is a like view of the same with parts in position after the first bevel cut is made. Fig. 8 is a transverse section of part of the same on the line 8 8 of Fig. 7. Fig. 9 is an inverted plan view of the sectional bearing for the pivot of the saddle for the tool-stock of the front spreading cutters. Fig. 10 is a side elevation of a finished spool having beveled inner faces on its flanges. Fig. 11 is a like view of a finished spool having straight inner flange-faces, and Fig. 12 is a side elevation of the pinion-key for adjusting the saddle-bearings.

In the machine presently to be described in detail a roughened-out spool having a finished shank $A$ and end flanges $A'$ $A^2$ is mounted on a revoluble head-stock center $B$ and a tail-stock center $C$, and the said flanges $A'$ and $A^2$ are first reduced to the desired diameter by a pair of longitudinally-moving cutters $D$ $D'$, and then the inner faces of the flanges $A'$ and $A^2$ are faced by a pair of transversely-movable front cutters $E$ $E'$ during their inward movement, (see Fig. 6,) and when the said cutters $E$ and $E'$ are backed out to half-way then the said cutters $E$ and $E'$ are gradually spread apart during the remaining half of the backing-out movement to form preliminary bevels $A^3$ on the flanges $A'$ $A^2$, (see Fig. 7,) and then the said cutters are returned to their first position and again run in, but without doing any work and until they reach the spindle $A$, after which these cutters $E$ $E'$ are again gradually spread apart during their entire backing-out movement to form complete bevels $A^4$, (see Fig. 10,) and then transversely-movable rear pairs of cutters $F$ $F'$ and $F^2$ $F^3$ are simultaneously run in from the back of the machine to finish the outer faces of the flanges by the cutters $F$ $F^2$ to reduce the spool to the desired length, and at the same time the cutters $F'$ and $F^3$ finish the peripheral faces of the flanges $A'$ and $A^2$ either straight or round or one flange round and the other straight, as shown in Fig. 10, it being understood that for this shape of the flanges the cutters $F'$ and $F^3$ have correspondly-shaped cutting edges, as will be readily understood by reference to Fig. 2.

The head-stock center $B$ and the tail-stock center $C$ are of usual construction, so that further description of the same is not deemed necessary, it being understood, however, that the head-stock center is held on a spindle $B'$, journaled in suitable bearings $G'$, arranged on the main bed or frame $G$ of the machine, and on the said spindle $B'$ is secured a pulley $B^2$, connected by a belt with other machinery for imparting a rotary motion to the said spindle $B'$, the center $B$, and the spool under treatment at the time.

The longitudinally-movable cutters $D$ and $D'$ are arranged underneath the spool (see Figs. 3, 4, and 5) and are disposed obliquely and secured to tool-posts $D^2$ $D^3$, lengthwise adjustable on a slide $H$, secured thereto by bolts $D^4$. The slide $H$ is mounted to slide longitudinally in the guideways I' of a frame I, vertically adjustable on an auxiliary bed $G^2$ by a screw-rod $I^2$, mounted to turn in a bearing $G^3$ on the said auxiliary bed, the screw-rod screwing in a nut $I^3$, formed on the bottom of the frame I. Bolts $I^4$ screw in the auxiliary bed $G^2$ and extend through vertically-elongated slots $I^5$ in the sides of the frame I to allow of adjusting the frame vertically by the screw-rod $I^2$ and to securely clamp the frame in position after the desired adjustment is made. By the arrangement described the upper cutting edges of the cutters D D' can be brought nearer to or farther from the spool-flanges $A'$ $A^2$ to cut and reduce the same to the desired diameter.

The right-hand end of the slide H is provided with a longitudinally-extending rigid arm H', having a plurality of spaced apertures $H^2$, one of which is engaged at a time by a bolt $H^3$, which serves to fasten the arm H' to a block $H^4$, mounted to slide vertically in guideways $H^5$, secured or formed on a slide $H^6$, mounted to slide longitudinally in guideways C', formed on a tool-stock $C^2$, fastened by bolts $C^3$ in position on the guideways $G^4$ of the main bed G, the said guideways $G^4$ being also engaged by the auxiliary bed $G^2$ to allow of sliding the latter longitudinally on the said guideways by the operator turning a screw-rod $G^5$, mounted to turn in a bearing $G^6$ on the main bed and engaging a nut $G^7$ on the said auxiliary bed $G^2$.

The slide $H^6$ is provided on its outer end with a loop $H^7$, through which extends a hand-lever $H^8$, fulcrumed at $H^9$ on the tool-stock $C^2$, the free end of the said lever being under the control of the operator to move the slide $H^6$ longitudinally and to move the slide H with the slide $H^6$ to cause the cutters D and D' to move longitudinally in engagement with the peripheral surface of the flanges $A'$ $A^2$ to turn the same to the desired diameter.

It is understood that when the operator moves the hand-lever $H^8$ from the right to the left the flanges $A'$ $A^2$ are reduced, as described, and when this has been done the operator moves the hand-lever $H^8$ back to its former position to bring the cutters D and D' to one side of the flanges, as plainly illustrated in Fig. 3.

Now by having the arm H' connected with the vertically-movable block $H^4$ it is evident that the frame I can be adjusted vertically for the purpose described without disturbing the slide $H^6$ and the lever $H^7$ for moving the said slides $H^6$ and H.

The cutters E and E' are removably secured in tool-posts $E^2$ $E^3$, (see Figs. 5, 6, 7, and 8,) fulcrumed at $E^4$ on cross-heads J and J' and provided on their free ends with segmental slots $E^5$, engaged by bolts $E^6$, for securing the tool-posts in position on the cross-heads J J' after the tool-posts are swung into the proper position to bring the cutters E and E' in proper transverse alinement, as shown in Fig. 6. The cross-heads J and J' are mounted to slide on saddles K and K' and the inward movement of the said cross-heads is limited by stop-bolts $J^2$ $J^3$, adjustable in the outer ends of the cross-heads and adapted to abut at their inner ends against the outer ends of the saddles K and K'. The latter are provided at their under sides with pivots $K^2$ $K^3$, respectively, preferably in the form of frustums of cones, as plainly indicated in Fig. 8, and the said pivots engage seats $K^4$, each formed in a bearing made of sections $K^5$ $K^6$, held longitudinally adjustable in the guideway L' of a carriage L and adapted to be secured therein by set-screws $K^7$ to hold the bearings against movement after the same are moved to the desired position in the guideway L' of the carriage L in setting the machine, according to the shape of the spools to be finished.

The under side of the section $K^5$ of each bearing for the pivots $K^2$ $K^3$ is provided with a longitudinally-extending rack $K^8$, adapted to be engaged by a pinion-key $K^9$, inserted into an opening $L^2$, formed in the carriage L, to allow of adjusting the pivot-bearings in the guideway L' of the carriage L. When the desired adjustment is reached, the bearings are locked in place by the set-screws $K^7$, above referred to.

The carriage L is mounted to slide transversely in the auxiliary bed $G^2$, and the under side of the said carriage is provided with a transversely-extending rack $L^3$ in mesh with a pinion $L^4$, secured on a shaft $L^5$, journaled in suitable bearings on the under side of the auxiliary bed $G^2$, and on the outer end of the shaft $L^5$ is secured a handle $L^6$, adapted to be taken hold of by the operator to impart a rotary motion to the shaft $L^5$ to cause the pinion $L^4$ to move the rack $L^3$ and its carriage L transversely and with it the parts carried by the said carriage.

By the arrangement described the cutters E and E' can be run in or out on the operator turning the handle $L^6$ correspondingly.

The inward movement of the carriage L is limited by a stop $L^7$, adjustably secured on the rack $L^3$ and adapted to abut on the auxiliary bed $G^2$.

Now when the carriage L is run inward, and with it the cutters E and E', then the latter turn the inner faces of the flanges $A'$ and $A^2$, as will be readily understood by reference to Fig. 6. When this has been done, the operator turns the handle $L^6$ back until the cutters have moved outward approximately to half the distance of the depth of the flanges $A'$ and $A^2$, and then during the remaining outward movement of the said cutters the latter are spread apart, as previously mentioned, to trim off the corners of the flanges, as illustrated in Fig. 7. Now for imparting this spreading movement to the cutters E and E' while the carriage L remains at a standstill I provide the following device: On the top of the cross-heads J and J' are journaled friction-rollers $J^4$ $J^5$, respectively engaged by angular channels $N'$ $N^2$, formed in the under side of a slide N, mounted to slide transversely in suitable bearings on the carriage L, and on the under side of the said slide N is secured or formed a rack $N^3$ in mesh with a pinion $N^4$, fastened on a shaft $N^5$, journaled in suitable bearings on the carriage L. On the shaft $N^5$ is secured a handle $N^6$, under the control of the operator, for turning the shaft $N^5$ and pinion $N^4$, so as to impart a transverse sliding movement to the rack $N^3$ and the slide N. Now when the handle $N^6$ is thrown over at the time the cutters E and E' have moved back half the distance of the depth of the flanges $A'$ $A^2$, then the transverse-sliding movement given to the slide N causes its channels $N'$ $N^2$ to act on the friction-rollers $J^4$ $J^5$ to slide the cross-heads J J' outwardly on the obliquely-disposed saddles K K', so that the cutters E E' move apart or from each other and at the same time back out, so that the cutters cut off the corners of the flanges $A'$ and $A^2$, as will be readily understood by reference to Fig. 7. When the corners have been cut off as described, then the operator throws the handle $N^6$ back to its former position—that is, until the stop-bolts $J^2$ $J^3$ abut against the outer ends of the saddles K K'—so that the cross-heads J and J' bring the cutters E and E' into their original position, and then the operator turns the handle $L^6$ to again run the carriage L, and with it the cutters E and E', inward until the inner ends of the cutters are close to the shank A of the spool. The operator now actuates the handle $N^6$ to cause the cutters E and E' to again spread apart, owing to the oblique outward sliding movement of the cross-heads J and J', so that the complete bevels $A^4$ are formed on the inner faces of the flanges $A'$ $A^2$. (See Fig. 10.)

The sets of cutters F F' and $F^2$ $F^3$ are removably secured in suitable tool-posts O O', held longitudinally adjustable in a carriage P, mounted to slide transversely on the rear end of the auxiliary bed $G^2$, and the said carriage P is provided with a forwardly-extending rack P' in mesh with a pinion $P^2$, (see Fig. 1,) fastened on a shaft $P^3$, journaled in suitable bearings on the forward end of the auxiliary bed $G^2$. A handle $P^4$ is secured on the outer end of the shaft $P^3$ to be within convenient reach of the operator for the latter to swing the handle $P^4$ downward to move the carriage P, and with it the tool-posts O O' and the sets of cutters F F' and $F^2$ $F^3$, forwardly to finish the outer faces of the flanges by the cutters F and $F^2$, thereby reducing the spool to the desired length, and at the same time the cutters F' and $F^3$ finish the peripheral faces of the flanges $A'$ and $A^2$.

The forward-sliding movement of the carriage P and the parts carried thereby is limited by a stop $P^5$, adjustably held on the carriage and adapted to engage a fixed stop $P^6$ on the auxiliary bed $G^2$, as indicated in Fig. 5.

As soon as the sets of cutters F F' and $F^2$ $F^3$ have finished their work the operator swings the handle $P^4$ back to the uppermost position (shown in Figs. 1 and 5) to back the sets of cutters F F' and $F^2$ $F^3$ from the finished spool.

The operation is as follows: When the several parts are in the position illustrated in Figs. 2, 3, and 4 and the roughened spool is held in the head-stock center B and the tail-stock center C and rotary motion is given to the spindle B' to rotate the roughened spool, then the operator, in order to finish the spool, first swings the lever $H^8$ from the right to the left to cause the cutters D and D' to reduce the flanges A A' to the desired diameter, and then the lever $H^8$ is swung back to its former position. The operator now takes hold of the handle $L^6$ and swings the same upward to move the carriage L, and with it the cutters E E', inward for the cutters to cut the inner faces of the flanges $A'$ $A^2$, it being understood that the inward movement of the carriage and cutters is limited by the stop $L^7$ abutting against the auxiliary bed $G^2$ to prevent the cutters from cutting into the shank of the spool. When the inner faces of the flanges $A'$ $A^2$ have been cut, then the operator swings the handle $L^6$ backward, and at the time the free ends of the cutters E E' have backed out about half the distance on the flanges $A'$ $A^2$ then the operator imparts a forward-swinging motion to the handle $N^6$ to cause the cutters E E' to spread, as previously described, to cut off the corners of the flanges $A'$ $A^2$. The operator now completes the backing out of the carriage by actuating the handle $L^6$ correspondingly, and when this has been done (see Fig. 7) then the operator imparts a return-swinging motion to the handle $N^6$ to bring the cutters E E' back to their original starting position. The operator now swings the handle $L^6$ upward to feed the carriage L and the cutters E E' inward without the latter doing any cutting and until the cutters stand with their inner ends on the shank A of the spool, and then the operator imparts a swinging motion to the handle $N^6$, so that the cutters E E' are spread apart and back out to form the complete bevels $A^4$ on the flanges $A'$ $A^2$ of the spool. When this has been done, the operator imparts a downward swinging motion to the handle $P^4$, so as to move the carriage P forward to cause the sets of cutters F F' and $F^2$ $F^3$ to finish the outer faces of the flanges, to reduce the spool to the length desired, and at the same time finish the peripheral faces of the said flanges. The handle $P^4$ is now returned to its original position to move the sets of cutters F F' and $F^2$ $F^3$ to a rearmost position, and then the finished spool is removed from the centers and a new rough spool is placed in position thereon and the above-described operation is then repeated.

It is understood that by having the various adjustments for the tool-posts of the several cutters I am enabled to finish spools of different shapes and sizes. It is especially important that the saddles K K' be mounted to swing to bring the same and their cross-heads J J' into an oblique position corresponding to the bevels to be cut on the inner faces of the spools, and by having the bearings for the pivots K² K³ of the saddles longitudinally adjustable on the carriage L it is evident that the tools E E' can be moved farther apart or nearer together, according to the distance between the inner faces of the spool-flanges.

If it is desired to form spools with parallel inner sides at the flanges, as shown in Fig. 11, it is not necessary to move the cutters E and E' obliquely, and hence the mechanism for this movement may be omitted, or, if desired, a carriage like the carriage P and having tool-posts O O' and cutters, such as F, may be employed instead of the carriage L and moved transversely by the action of the gearing controlled by the handle L⁶.

Having thus described my invention, I claim as new and desire to secure by Letters Patent—

1. A spool-cutting lathe provided with a tool-post slide, for supporting a plurality of spaced cutters, means for imparting a reciprocating motion to the slide in the direction of the length of the lathe-centers, and means for adjusting the slide toward or from the axis of the lathe-centers, as set forth.

2. A spool-cutting lathe provided with a tool-post slide, a frame in which the said slide is mounted to reciprocate in the direction of the length of the spool, and means for adjusting the said frame at right angles to the line of movement of the slide, to move the latter and its tools toward or from the axis of the lathe-centers, as set forth.

3. A spool-cutting lathe, provided with a frame adjustable toward and from the axis of the lathe-centers, a slide for carrying the tools and mounted to reciprocate longitudinally on the said frame and in the direction of the length of the lathe-centers, a block movable in the same direction as that of the said frame and connected with the said slide, a carrier in which the said block is mounted to slide, and means for imparting a longitudinal motion to the said carrier in the same direction as that of the said slide, as set forth.

4. A spool-cutting lathe provided with a main bed, centering devices thereon, for holding and revolving the spool to be treated, an auxiliary bed adjustable lengthwise on the said bed and extending transversely to the centering devices, a frame held vertically adjustable on the auxiliary bed and provided on its top with longitudinal guideways, a slide movable in the said guideways and carrying tools, a block having an adjustable connection with the said slide, a movable carrier having vertical bearings for the said block to slide in, and a hand-lever under the control of the operator, for imparting a longitudinal movement to the said carrier, as set forth.

5. A spool-cutting lathe having a device for facing and beveling the inner faces of the spool-flanges, comprising slidable cross-heads for supporting tools, provided with projections, obliquely-disposed saddles upon which the cross-heads are mounted to reciprocate, a carriage mounted to slide transversely and carrying the said saddles, means for operating the carriage, a transversely-movable slide mounted on the carriage and having angular guideways to receive the projections of the cross-heads, and means for operating said slide, as set forth.

6. A spool-cutting lathe having a device for facing and beveling the inner faces of the spool-flanges, comprising a carriage mounted to slide transversely, means for operating the carriage, saddles pivotally and adjustably mounted on the carriage, cross-heads mounted to reciprocate on the saddles and provided with projections on their upper faces, pivoted and adjustable tool-posts mounted in the cross-heads, a transversely-movable slide mounted on the carriage and having angular guideways to receive the projections of the cross-heads, and means for operating the slides, as set forth.

7. A spool-cutting lathe having a beveling device for beveling the inner faces of the spool-flanges, comprising a carriage mounted to slide transversely, sectional bearings adjustable on the said frame, saddles having pivots fitting the said bearings, cross-heads slidable on the said saddles and carrying cutting-tools, and means on the frame for securing the sectional bearings upon the pivots, as set forth.

8. A spool-cutting lathe having a beveling device for beveling the inner faces of the spool-flanges, comprising a carriage mounted to slide transversely, sectional bearings adjustable on the said frame, saddles having pivots fitting the said bearings, cross-heads slidable on the said saddles and carrying cutting-tools, and means on the frame for securing the sectional bearings upon the pivots, the latter being conical and fitting correspondingly-shaped seats in the bearings, as set forth.

9. A spool-cutting lathe having a beveling device for beveling the inner faces of the spool-flanges, comprising a carriage mounted to slide transversely, bearings held longitudinally adjustable on the said carriage, saddles pivoted on the said bearings and adapted to be locked thereto, cross-heads mounted to reciprocate on the said saddles and carrying cutting-tools, and a slide mounted to travel transversely on the carriage and having angular channels engaging projections on the cross-heads, as set forth.

10. A spool-cutting lathe having obliquely-disposed saddles, cross-heads carrying cutting-tools slidable on the saddles, and provided with friction-rollers, and a reciprocating slide having angular channels engaging the friction-rollers, to move the said cross-heads on the said saddles, as set forth.

11. A spool-cutting lathe provided with a beveling device for beveling the inner faces of the spool-flanges, comprising a manually-reciprocated carriage mounted to slide toward and from the centering devices of the lathe, oblique saddles on the carriage, cross-heads slidable on the said saddles and carrying beveling-tools, friction-rollers on the said cross-heads, a slide movable on the carriage and in the same direction as the carriage, the slide having angular channels engaging the said friction-rollers, and means mounted on the carriage and engaging the said slide, to move the latter on the carriage, as set forth.

12. A spool-cutting lathe provided with a beveling device for beveling the inner faces of the spool-flanges, comprising a manually-reciprocated carriage mounted to slide toward and from the centering devices of the lathe, oblique saddles on the carriage, cross-heads slidable on the said saddles and carrying beveling-tools, friction-rollers on the said cross-heads, a slide movable on the carriage and in the same direction as the carriage, the slide having angular channels engaging the said friction-rollers, means mounted on the carriage and engaging the said slide, to move the latter on the carriage, and stop-bolts on the said cross-heads, for limiting the inward movement of the said cross-heads, as set forth.

13. A spool-cutting lathe provided with a beveling device for beveling the inner faces of the spool-flanges, comprising a manually-reciprocated carriage mounted to slide toward and from the centering devices of the lathe, oblique saddles on the carriage, cross-heads slidable on the said saddles and carrying beveling-tools, friction-rollers on the said cross-heads, a slide movable on the carriage and in the same direction as the carriage, the slide having angular channels engaging the said friction-rollers, means mounted on the carriage and engaging the said slide, to move the latter on the carriage, and means for imparting a sliding motion to the carriage and for limiting the inward movement thereof, as set forth.

14. A spool-cutting lathe having a transversely-movable carriage provided with a longitudinal guideway, a sectional bearing fitted in the said guideway and having a conical-shaped seat, a saddle having a depending conical pivot fitting the said seat, and set-screws on the said carriage, engaging the said bearing to lock the latter in place in the said guideway and to clamp the bearing-sections on the pivot, to hold the latter against turning, as set forth.

15. A spool-cutting lathe having a transversely-movable carriage provided with a longitudinal guideway, a sectional bearing fitted in the said guideway and having a conical-shaped seat, a saddle having a depending conical pivot fitting the said seat, and means for moving the bearing and its pivot in the said guideway of the carriage, as set forth.

16. A spool-cutting lathe having a carriage provided with longitudinal guideways, an opening leading thereto, a bearing slidable in the guideway and having a conical seat, and rack-teeth extending parallel to the guideway and into the said opening, the said rack-teeth being adapted to be engaged by a key inserted into the said opening to move the bearing in the said guideway, as set forth.

17. A spool-cutting lathe having a carriage provided with longitudinal guideways, an opening leading thereto, a bearing slidable in the guideway and having a conical seat, rack-teeth extending parallel to the guideway and into the said opening, the said rack-teeth being adapted to be engaged by a key inserted into the said opening to move the bearing in the said guideway, and a saddle having a depending conical pivot engaging the said seat and moving with the bearing when the latter is shifted by the said key, as set forth.

18. A spool-cutting lathe provided with a beveling device for beveling the inner flange-faces of the spool, comprising a pair of tool-posts, cross-heads on which the tool-posts are held adjustable, oblique saddles on which the cross-heads are mounted to slide, friction-rollers on the said cross-heads, a slide having angular channels engaging the friction-rollers, a carriage on which the slide is mounted, a pinion journaled on the carriage and in mesh with a rack on the said slide, to move the latter on the carriage, and means for imparting movement to the carriage and in the same direction as the movement given to the slide, as set forth.

19. A spool-cutting lathe, having a carriage, sliding bearings each made in two sections, one section being provided with a rack, a pinion-key for engaging the racks of the bearings to adjust them, saddles provided on their under faces with pivots engaging said bearings, and reciprocating tool-carrying cross-heads on the saddles, as set forth.

20. A spool-cutting lathe, having a carriage, saddles adjustably mounted on the carriage, cross-heads mounted to slide on the saddles, means for sliding said cross-heads, tool-posts pivoted on the cross-heads, and means for locking the tool-posts in position, as set forth.

21. A spool-cutting lathe, having a carriage, obliquely-disposed saddles adjustably mounted on the carriage, cross-heads mounted to reciprocate on the saddles and provided with projections on their upper faces, a slide having angular channels on its under face and into which the projections of the cross-heads extend, and means for operating said slide, as set forth.

22. A spool-cutting lathe, having a carriage, obliquely-disposed saddles pivotally and adjustably mounted upon the carriage, cross-heads mounted to slide on the saddles, tool-posts pivotally and adjustably mounted on the cross-heads, and means for reciprocating the cross-heads, as set forth.

In testimony whereof I have signed my name to this specification in the presence of two subscribing witnesses.

GEORGE A. ENSIGN.

Witnesses:
  JOSEPH BAUER,
  GEORGE W. DEATRICK.